(12) United States Patent
Tiesler et al.

(10) Patent No.: US 7,128,450 B2
(45) Date of Patent: Oct. 31, 2006

(54) MODULAR LIGHT ASSEMBLY AND METHOD FOR INSTALLING A MODULAR LIGHT ASSEMBLY IN A VEHICLE

(75) Inventors: John M. Tiesler, Harrison Township, MI (US); Ted Chou, Rochester Hills, MI (US); Chuck Minear, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/607,681

(22) Filed: Jun. 27, 2003

(65) Prior Publication Data

US 2004/0264205 A1 Dec. 30, 2004

(51) Int. Cl.
*B60Q 1/00* (2006.01)
*H01R 33/00* (2006.01)

(52) U.S. Cl. ............... 362/487; 362/545; 362/549; 362/646

(58) Field of Classification Search ........... 362/549, 362/800, 545, 548, 144, 240, 251, 277, 377–378, 362/546, 543, 544, 372, 457, 646, 652
See application file for complete search history.

(56) References Cited

U.S. PATENT DOCUMENTS

| | | | |
|---|---|---|---|
| 4,285,033 A | 8/1981 | Hart | |
| 5,091,831 A | 2/1992 | Van Order et al. | |
| 5,357,408 A | 10/1994 | Lecznar et al. | |
| 5,388,357 A * | 2/1995 | Malita | 40/570 |
| 5,658,067 A | 8/1997 | Engle et al. | |
| 5,811,930 A | 9/1998 | Krafcik et al. | |
| 6,069,444 A | 5/2000 | Krafcik et al. | |
| 6,193,391 B1 | 2/2001 | Ray et al. | |
| 6,462,669 B1 * | 10/2002 | Pederson | 340/815.45 |
| 6,541,800 B1 * | 4/2003 | Barnett et al. | 257/98 |
| 6,834,906 B1 * | 12/2004 | Vaitus et al. | 296/106 |
| 6,840,660 B1 * | 1/2005 | Hymer | 362/545 |

* cited by examiner

*Primary Examiner*—Sandra O'Shea
*Assistant Examiner*—Guiyoung Lee
(74) *Attorney, Agent, or Firm*—MacMillan, Sobanski & Todd, LLC

(57) ABSTRACT

A method for installing a modular light assembly in a vehicle includes first providing a common printed circuit board base. One of a plurality of different types of illumination sources is then attached onto the printed circuit board base to form a modular light assembly. The modular light assembly is then mounted onto one of a plurality of trim bezels.

15 Claims, 2 Drawing Sheets

MODULAR LIGHT ASSEMBLY AND METHOD FOR INSTALLING A MODULAR LIGHT ASSEMBLY IN A VEHICLE

TECHNICAL FIELD

This invention relates to modular light assemblies for a vehicle. More particularly, the invention relates modular light assemblies having a common printed circuit board base.

BACKGROUND OF THE INVENTION

Light assemblies for vehicles, such as for overhead lamps and the like, typically employ a housing mounted to the vehicle. A variety of lamps, such as bulbs, lamp sockets, and switching components are typically mounted within the housing. The light assembly also typically includes a trim bezel which can include lenses, diffusers and the like.

The housing and socket of such assemblies are typically first installed in a vehicle component, such as a headliner or an instrument panel. An associated wiring harness is then attached to the light assembly. Subsequently, the vehicle component mounted to the vehicle and an interconnecting wiring harness in the vehicle is connected to one or more of the harnesses associated with the vehicle component. The wiring harness typically includes a bundle of wires having connectors at opposite ends for coupling the lamp housing to the vehicle electrical system as the vehicle component is installed. It would be advantageous if there could be developed an improved modular light assembly for a vehicle.

SUMMARY OF THE INVENTION

This invention relates to an improved modular light assembly and an improved method for installing a modular light assembly in a vehicle. The method includes first providing a common printed circuit board base. One of a plurality of different types of illumination sources is then attached onto the printed circuit board base to form a modular light assembly. The modular light assembly is then mounted onto one of a plurality of trim bezels.

According to this invention, there is also provided a plurality of modular light assemblies. Each modular light assembly includes a common printed circuit board base. One of a first and a second illumination source is provided, wherein the first and the second illumination sources are of different types. A mounting bracket for attaching the illumination source to the printed circuit board base is also provided.

Various objects and advantages of this invention will become apparent to those skilled in the art from the following detailed description of the preferred embodiments, when read in light of the accompanying drawings.

DETAILED DESCRIPTION OF THE INVENTION

Figure 1:
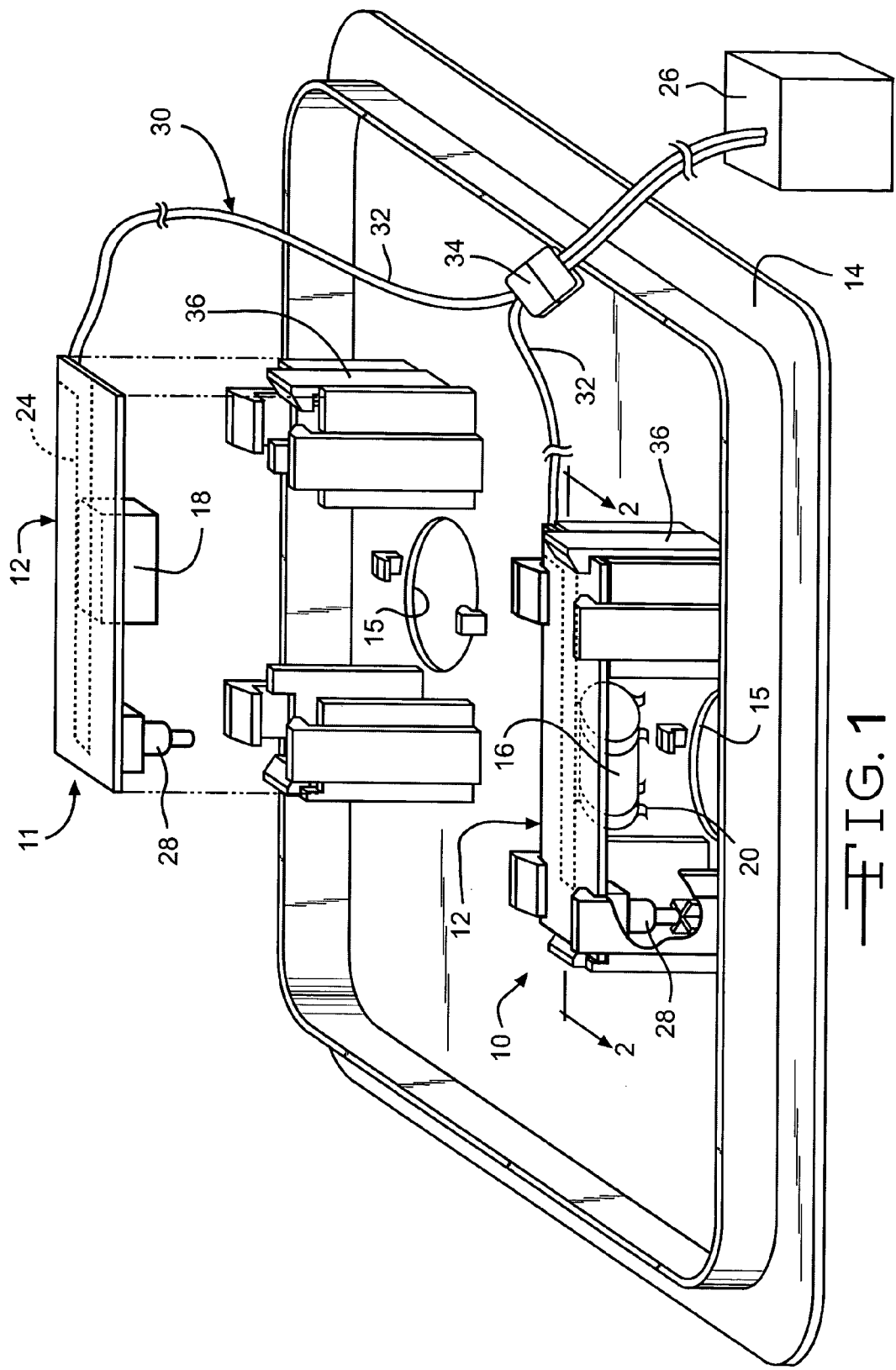
FIG. 1 is an exploded perspective view of a modular light assembly manufactured according to the invention.

Referring to FIG. 1, there are generally shown at 10 and 11 modular light assemblies manufactured in accordance with the method of the invention. The modular light assemblies 10 and 11 include a common printed circuit board base 12.

It will be understood that the phrase "common circuit board base" is defined as one of a plurality of bases, each having a common size, such that each of the plurality of bases can be mounted into a common mount or fixture, such as a trim bezel 14, as herein described.

Figure 2:
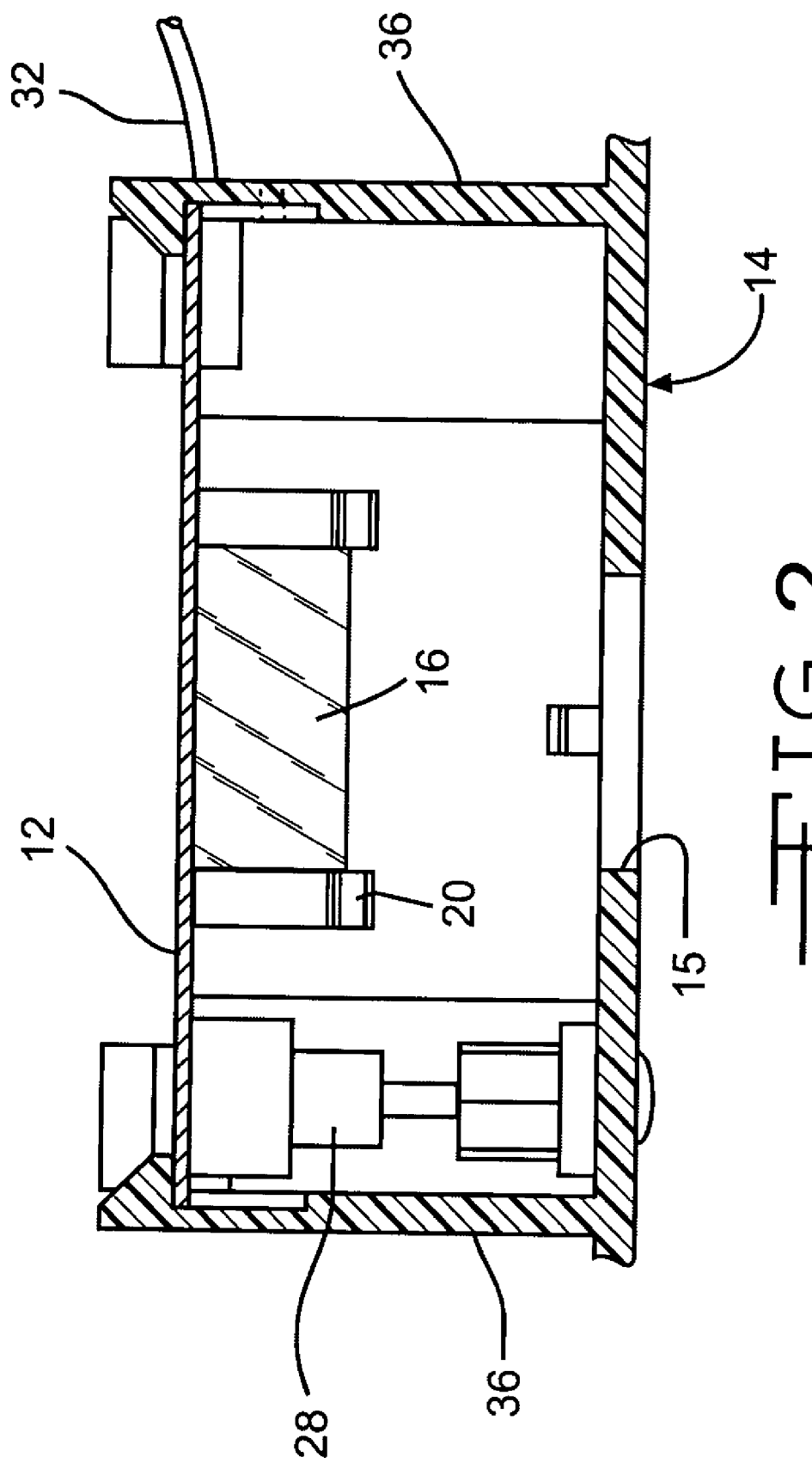
FIG. 2 is an enlarged perspective view of the common printed circuit board base illustrated in FIG. 1.

The modular light assembly 10 can be provided with different types of illumination sources. For example, the illumination source can be an incandescent bulb 16, a light emitting diode (LED) 18, or an electroluminescent (EL) device (not shown). As shown in FIGS. 1 and 2, the incandescent bulb 16 and the LED 18 are suitably mounted to a mounting bracket of the printed circuit board base 12. For example, as shown in FIG. 1, a bulb clip 20 is attached to the printed circuit board base 12. The bulb clip 20 can be attached to the printed circuit board base by any desired method, such as by soldering. The incandescent bulb 16 is then attached to the bulb clip 20 of the printed circuit board base 12.

As also shown in FIG. 1, the LED 18 is attached to the printed circuit board base 12. Preferably, the LED 18 is attached to the printed circuit board base 12 by soldering, however, any other desired method of attachment can also be used.

It will be understood that the incandescent bulb 16 can be any desired type of incandescent bulb, such as a dual filament bulb or a single filament bulb. The LED 18 can be any desired LED, such as a multi-colored LED or a single colored LED. Additionally, the EL device can be any desired EL device. However, it will be also understood that the illumination source can also be any other desired illumination source.

Preferably, the common printed circuit board base 12 has an electrical circuit 24 thereon for electrically connecting the illumination source to a source of electrical energy, illustrated schematically at 26. The electrical circuit 24 can be formed of any desired material, such as an electrical wire or an electrically conductive trace. If desired, the electrical circuit 24 can include a resister (not shown).

If desired, common printed circuit board base 12 of the modular light assemblies 10 and 11 can include a switch, such as a push switch 28, however such a switch is not required. The switch can also be of any other desired type, such as a slide switch (not shown).

Preferably, the common printed circuit board base 12 of the modular light assembly 10 is integrally formed with a vehicle wiring harness assembly 30. Known light assemblies can include a light assembly connector for attaching to a corresponding connector of a vehicle wiring harness. However, by integrally forming the common printed circuit board base 12 of the instant invention with the vehicle wiring harness assembly 30, both the light assembly connector and the corresponding wiring harness connector can be eliminated.

According to the method of the instant invention, the vehicle wiring harness assembly 30 is first assembled at an assembling location. Preferably, the wiring harness assembly 30 includes a plurality of wires 32, a plurality of connectors 34, only one of which is shown for illustrative purposes, and a plurality of light assemblies 10 and 11. More preferably, the connectors 34 and the light assemblies 10 and 11 are connected to ends of the wires 32.

Subsequently, the wiring harness assembly 30 is installed into a vehicle component, such as a headliner or an instrument panel. Preferably, each light assembly 10 and 11 is mounted to the trim bezel 14. It will be understood that the wires 32 of the wiring harness assembly 30 can be round wires, flat wires, or any combination thereof. The wires of the wiring harness assembly 30 can also be any other desired type of wire or other electrically conductive material. It will be further understood that more than one light assembly, such as light assemblies 10 and 11, can be mounted in one trim bezel 14.

The trim bezel 14 preferably includes an opening 15 for receiving a lens (not shown). Preferably, the trim bezel 14 includes a plurality of outwardly extending mounting fingers 36. More preferably, the fingers 36 are structured and configured to retain the printed circuit board base 12 in the trim bezel 14, as shown in FIGS. 1 and 2. Most preferably, the mounting fingers 36 are structured and configured such that the printed circuit board base 12 can be mounted to the mounting fingers 36 in a snap-fit arrangement.

Although integrally formed mounting fingers 36 are illustrated in FIGS. 1 and 2, it will be understood that satisfactory results may also be achieved by any desired structure for attaching the printed circuit board base 12 to a surface of the trim bezel 14.

Although illustrated in the exemplary embodiment as a separate piece, it will be understood that the trim bezel 14 can also be integrally formed into another part of the vehicle, such as the instrument panel. For example, the mounting fingers 36 can extend outwardly from a surface of the vehicle instrument panel.

The invention is also described in the context of installing a modular light assembly, and installing a wiring harness having a plurality light assemblies, in a vehicle component. However, it will be understood that the method of the invention can be used to install a modular light assembly, and install a wiring harness having a plurality light assemblies, in other component configurations, such as components for boats or appliances, for example.

The principle and mode of operation of this invention have been described in its preferred embodiments. However, it should be noted that this invention may be practiced otherwise than as specifically illustrated and described without departing from its scope.

What is claimed is:

1. A method of installing a modular light assembly in a vehicle, the method comprising the steps of:
   a. providing a first modular light assembly including a first printed circuit board base having a first type of illumination source;
   b. providing a second modular light assembly including a second printed circuit board base having a second type of illumination source different from the first type;
   c. providing a trim bezel having a single common mounting location including a plurality of mounting fingers extending outwardly from the trim bezel adapted to accept either one of the first modular light assembly and the second modular light assembly; and
   d. mounting the one of the first and the second modular light assemblies to the mounting fingers at the common location of the trim bezel.

2. The method according to claim 1, wherein at least one of the first and the second printed circuit board bases has an electrical circuit thereon connecting the illumination source to a source of electrical energy.

3. The method according to claim 2, wherein the electrical circuit comprises one of an electrical wire and an electrically conductive trace.

4. The method according to claim 1, wherein at least one of the first type and the second type of illumination sources is selected from the group consisting of incandescent bulbs, light emitting diodes, and electroluminescent devices.

5. The method according to claim 1, wherein at least one of the first and the second printed circuit board bases further includes a switch.

6. The method according to claim 1, wherein at least one of the first and the second printed circuit board bases is integrally formed with a vehicle wiring harness assembly.

7. The method according to claim 1, wherein step (d) further includes mounting the one of the first and the second modular light assemblies to the mounting fingers in a snap-fit arrangement.

8. A method of installing a modular light assembly in a vehicle, the method comprising the steps of:
   a. providing a first modular light assembly including a first printed circuit board base having an incandescent bulb type of illumination source;
   b. providing a second modular light assembly including a second printed circuit board base having a light emitting diode type of illumination source;
   c. providing a trim bezel having a single common mounting location including a plurality of mounting fingers extending outwardly from the trim bezel adapted to accept either one of the first modular light assembly and the second modular light assembly; and
   d. mounting the one of the first and the second modular light assemblies to the mounting fingers at the common location of the trim bezel.

9. A method of installing a modular light assembly in a vehicle, the method comprising the steps of:
   a. providing a first modular light assembly including a first printed circuit board base having a first type of illumination source;
   b. providing a second modular light assembly including a second printed circuit board base having a second type of illumination source different from the first type;
   c. providing a trim bezel having a single common mounting location adapted to accept either one of the first modular light assembly and the second modular light assembly;
   d. mounting the one of the first and the second modular light assemblies to the common location of the trim bezel; and
   e. installing the trim bezel and the selected one of the first modular light assembly and the second modular light assembly in a vehicle.

10. The method according to claim 9, wherein at least one of the first and the second printed circuit board bases has an electrical circuit thereon connecting the illumination source to a source of electrical energy.

11. The method according to claim 10, wherein the electrical circuit comprises one of an electrical wire and an electrically conductive trace.

12. The method according to claim 9, wherein at least one of the first type and the second type of illumination sources is selected from the group consisting of incandescent bulbs, light emitting diodes, and electroluminescent devices.

13. The method according to claim 9, wherein at least one of the first and the second printed circuit board bases further includes a switch.

14. The method according to claim 9, wherein at least one of the first and the second printed circuit board bases is integrally formed with a vehicle wiring harness assembly.

15. The method according to claim 9, wherein the trim bezel includes a plurality of mounting fingers extending outwardly from the trim bezel, and wherein step (d) further includes mounting the one of the first and the second modular light assemblies to the mounting fingers in a snap-fit arrangement.

* * * * *